United States Patent [19]
Yamakawa et al.

[11] Patent Number: 4,577,935
[45] Date of Patent: Mar. 25, 1986

[54] VIDEO PROJECTOR LENS SYSTEM

[75] Inventors: Kazuo Yamakawa, Sakai; Toshihide Dohi, Minamikawachi, both of Japan

[73] Assignee: Minolta Camera Kabushika Kaisha, Osaka, Japan

[21] Appl. No.: 347,032

[22] Filed: Feb. 8, 1982

Related U.S. Application Data

[63] Continuation-in-part of Ser. No. 234,990, Feb. 17, 1981, abandoned.

[30] Foreign Application Priority Data

Mar. 3, 1980 [JP] Japan .................................. 55-28859
Sep. 8, 1980 [JP] Japan ................................ 55-109604
Jan. 8, 1982 [JP] Japan .................................... 57-1947

[51] Int. Cl.⁴ ............................. G02B 3/02; G02B 9/12
[52] U.S. Cl. ...................................... 350/432; 350/412
[58] Field of Search ................ 350/412, 177, 432, 473

[56] References Cited

U.S. PATENT DOCUMENTS 3,800,085 3/1974 Ambat et al. .
4,300,817 11/1981 Betensky ............................. 350/412
4,348,081 9/1983 Betensky ............................. 350/412

FOREIGN PATENT DOCUMENTS 2936548 5/1980 Fed. Rep. of Germany .
56-78815 1/1981 Japan .

Primary Examiner—John K. Corbin
Assistant Examiner—Paul Dzierzynski
Attorney, Agent, or Firm—Price, Gess & Ubell

[57] ABSTRACT

Disclosed is a lens system for projecting onto a screen a video image formed on a face plate of a cathode ray tube and including, a first positive lens unit, a second positive lens unit defined between a pair of convex surfaces and a third negative lens unit having a screen side concave surface. The lens system includes at least one aspheric surface and fulfills the following condition: $1.5f < f1 < 2.0f$, wherein f represents the focal length of the whole lens system and f1 represents the focal length of the first positive lens unit.

11 Claims, 21 Drawing Figures

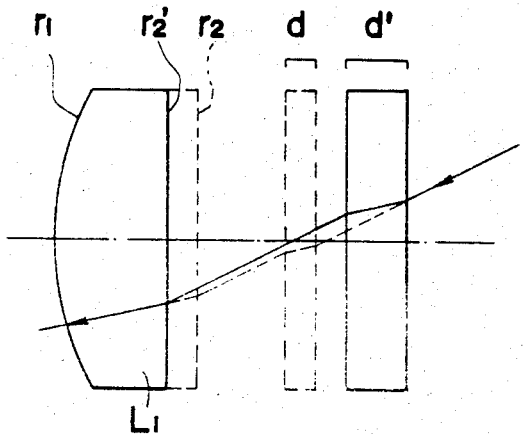
FIG.4
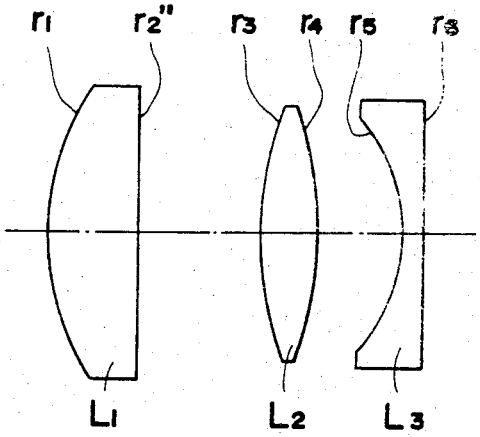
FIG.5
FIG.6
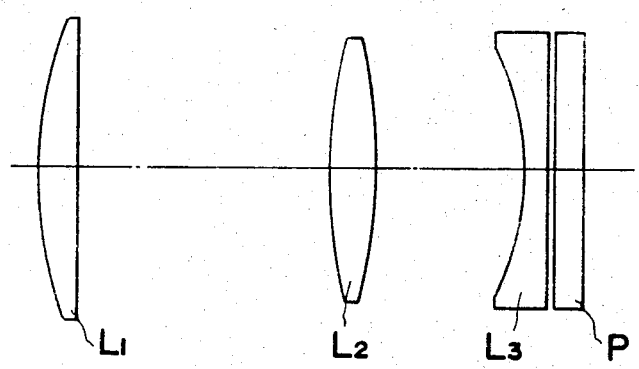

−0.5  0.5  mm

Spherical Aberration

−0.5  0.5  mm

Astigmatism

Spherical Aberration

Astigmatism

Spherical Aberration

Astigmatism

Spherical Aberration

Astigmatism

VIDEO PROJECTOR LENS SYSTEM

BACKGROUND OF THE INVENTION

1. Related Subject Matter

This is a continuation-in-part of application Ser. No. 234,990 filed Feb. 17, 1981 now abandoned.

2. Field of the Invention

The present invention relates to a lens system for a video projector, and more particularly to a refractive lens system located in front of the cathode ray tube for projecting onto a screen a video image formed on a face plate of the cathode ray tube.

3. Description of the Prior Art

There have been known video projection lens systems consisting of about four to six glass lens elements. It has generally been necessary to increase the number of glass lens elements if a greater aperture ratio and/or a greater field angle is desired.

It has been also known to use plastic lens elements since the plastic lens elements can be easily formed as aspheric lens elements and are favorable for reducing the number of lens elements with the same optical performance maintained or even improved. For instance, it may be possible to design a high optical performance lens system with three plastic single lens elements having aspheric surfaces.

In the case of designing a video projection lens system with plastic lens elements, however, there occurs a new problem which has not been a problem in the case of glass lens system. X-ray radiation is generated at the fluorescent surface of the face plate scanned by the electron gun in the cathode ray tube of the video projector. If a glass lens system is used, however, there has not been any problem since the glass lens system generally comprises at least one flint glass lens element which in its nature shields and reduces the amount of X-ray radiation transmitted through the lens system to a safe permissible level. In the case of a plastic lens system, however, there is a possibility that the amount of X-ray radiation transmitted through the lens system will exceed the permissible level because of a lesser ability to shield X-ray radiation.

To solve the above problem, which is specific to the use of a plastic lens system, it may be possible to include at least one glass lens element having a greater X-ray shielding ability in the plastic lens system. Such a glass lens element is, however, extremely unfavorable for forming a necessary aspheric surface. Furthermore, the thickness of the glass lens element has to be determined, taking into consideration not only the optical performance but also the X-ray shielding capacity which restricts the freedom of the lens design. In addition, even if a lens system with a desired optical performance and an X-ray shielding capacity applicable to one specific cathode ray tube is designed, the lens system would be difficult to be applied to another cathode ray tube with a greater amount of X-ray radiation, since the X-ray shielding capacity of the lens system, as it is, is limited and any attempt to increase the thickness of the glass lens element to increase the X-ray shielding capacity would lead to a destruction of the original lens design in view of the optical performance.

Another solution to the problem of how to shield X-ray radiation with a plastic lens system would be to insert an X-ray shielding planoparallel glass plate in a space between the plastic lens system and the face plate of the cathode ray tube where the optical performance is less affected by the insertion of the planoparallel glass plate. However, such an insertion of an additional element does affect the optical performance in principle, and the affection cannot be neglected, if the thickness of the inserted planoparallel glass plate is further increased to increase the X-ray shielding capacity. In addition, it is also possible that the insertion of the glass plate may be impossible because of the limited space between the lens system and the face plate.

Accordingly, the prior art is still seeking to provide an improved radiation safe video projection lens system that can be economically manufactured.

SUMMARY OF THE INVENTION

An object of the present invention is to provide a video projector device with a compact and high quality plastic lens system having a desirable X-ray shielding capacity.

Another object of the present invention is to provide such a video projector plastic lens system capable of easily changing the X-ray shielding capacity with the original designed optical performance still maintained.

Another object of the present invention is to provide a video projector plastic lens system capable of being designed free from any consideration of a specific degree of X-ray shielding capacity that can be simply provided with any desired degree of X-ray shielding capacity afterward.

A further object of the present invention is to provide a lens system which has a great aperture ratio and a high image forming performance with only a few lens elements.

According to one form of the present invention, all elements having refractive power in the lens system are made of plastic to easily provide aspheric surfaces, and at least one of the plastic lens elements has one plane surface. A planoparallel glass plate is located to face the plane surface of the plastic lens element. Any desired X-ray shielding capacity is obtainable with the designed optical performance maintained, by changing the thickness of the planoparallel glass plate and changing the thickness of the plastic lens element, which has the plane surface facing the planoparallel glass plate so as to compensate for the change in the thickness of the planoparallel glass plate.

According to another form of the present invention, two or more lens elements can be made of plastic and preferably have an aspheric surface. Another lens element is formed of glass having the desired X-ray shielding capacity. The glass lens element can be a singlet or part of a doublet. One lens element in the doublet can be made from plastic material, especially if an aspheric surface is desired on the doublet.

Further, according to the numerical examples of the present invention, the lens system has the following features for the purpose of achieving an aperture ratio greater than F/2, a high image forming performance, and a compact size. Namely, the lens system comprises, from the screen to tube side, a first positive lens unit, a second positive lens unit defined between a pair of convex surfaces, and a third negative lens unit having a screen side concave surface, each of the lens units having at least one aspheric surface, respectively, wherein the lens system fulfills the following conditions:

$1.2f < f_1 < 2.5f$ $1.2 < f_1/f_2 < 2.5$; and $$0.3f < D < 0.5f,$$

wherein, f represents the focal length of the whole lens system, $f_1$ represents the focal length of the first positive lens unit, $f_2$ represents the focal length of the second positive lens unit, and D represents the air space between the second positive lens unit and the third negative lens unit.

The features of the present invention, which are believed to be novel, are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIGS. 3 and 4 represent schematic views of an essential part of the first embodiment for explaining the present invention;

FIG. 5 represents a schematic cross sectional view of a lens system optically equivalent to the first embodiment;

FIGS. 6, 7 and 8 represent schematic cross sectional views of a second, third and fourth embodiment of the present invention, respectively;

DETAILED DESCRIPTION OF THE PREFERRED EMBODIMENTS

The following specification, taken in conjunction with the drawings, sets forth the preferred embodiments of the present invention. The embodiments of the invention disclosed herein are the best modes contemplated by the inventors for carrying out their invention in the commercial optical video field, although it should be understood that various modifications can be accomplished within the parameters of the present invention.

Figure 1:
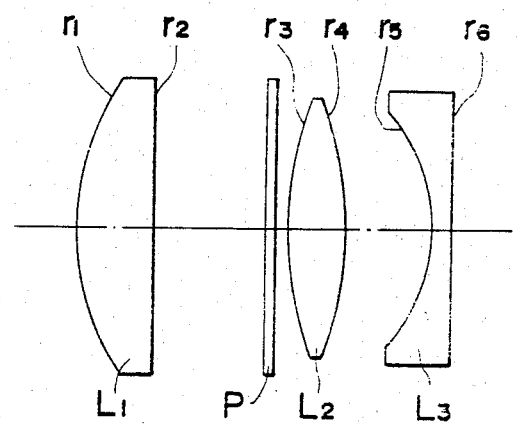
FIG. 1 represents a schematic cross sectional view of a first embodiment of the present invention.

FIG. 1 represents a first embodiment of a video projection lens system according to the present invention having three plastic single lens elements, $L_1$, $L_2$ and $L_3$. A cathode ray tube (not shown) of a television projector device is to be located on the righthand side of the projection lens system in FIG. 1, whereby a video image formed on a fluorescent plane of a face plate of the cathode ray tube is to be transmitted through the projection lens system to a screen (not shown) to be located on the lefthand side of the lens system in FIG. 1.

Lens element $L_1$ is of a positive refractive power with an aspheric surface, $r_1$ on the screen side and a plane surface, $r_2$ on the tube side. Lens element $L_2$ is a biconvex lens with an aspheric surface, $r_4$ on the tube side. Lens element $L_3$ is of a negative refractive power with an aspheric surface, $r_5$ on the screen side. In addition, P represents a planoparallel glass plate filter facing the plane surface, $r_2$ of lens element $L_1$. The planoparallel glass plate functions as a shield against the X-rays which would be generated by the cathode ray tube, so that the amount of X-rays which would undesirably leak out through the projection lens system can be restrained below a safe permissible level.

The following is an explanation of the contruction of the projection lens system, and why the planoparallel glass plate, P, faces a plane surface of a plastic lens element. The projection lens system, as is shown in FIG. 1, can be combined with a conventional type of cathode ray tube which generates X-ray radiation during operation. If the identical projection lens is to be combined with another type of cathode ray tube which has a thinner face plate in comparison with that of the first type of cathode ray tube, the capacity of the projection lens system for restraining the amount of X-ray radiation would be insufficient because the thinner face plate would normally have a lesser ability of shielding X-ray by itself and would allow a greater amount of X-ray radiation to be transmitted therethrough. In such a case, it is necessary to change and increase the axial thickness of the planoparallel glass plate filter, P, for increasing the ability of shielding X-ray radiation. On the other hand, the X-ray shielding ability of the planoparallel glass plate, P, depends on the glass material forming the glass plate, P. For instance, if a sufficient X-ray shielding against a cathode ray tube having a face plate with a thickness of 7 to 11 mm is possible with a planoparallel glass plate made of heavy flint glass with a thickness of 2 to 3 mm, a thickness of 7 to 8 mm would be necessary for an alternative planoparallel glass plate made of crown glass containing Celium Oxide to shield X-ray radiation to the same degree. Thus, it is also necessary to change the thickness of the planoparallel glass plate when the glass material has to be changed for some reason, such as cost.

Figure 2:
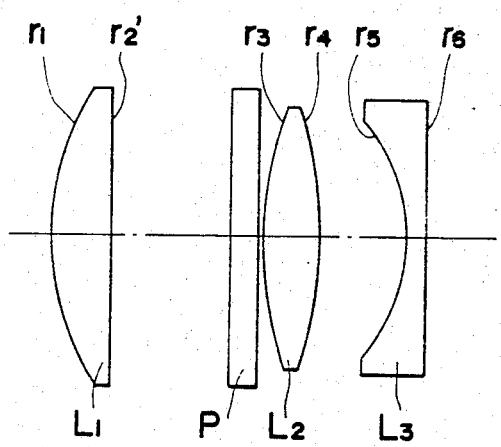
FIG. 2 represents a schematic cross sectional view of an optically equivalent modification of the first embodiment.

FIG. 2 represents a modification of the embodiment of FIG. 1, wherein the thickness of the planoparallel glass P has been increased for a reason such as mentioned above. It should be noted, however, that the disclosed constructions in FIGS. 1 and 2 are optically equal to each other, i.e., the optical performance is maintained. In other words, the materials for the plastic lens elements, $L_1$, $L_2$ and $L_3$ and the location of the surfaces, $r_1$ and $r_3$ to $r_6$ are not changed. An additional important point is that the location of the plane surface, $r_2$ of the lens element, $L_1$, facing the planoparallel glass plate, P, in FIG. 2 has been shifted towards the screen side to reduce the optical thickness of lens element $L_1$ by a value corresponding to the increase in the optical thickness of the planoparallel glass plate, P, in comparison with the structure of FIG. 1. However, the effective sum of the optical thickness of lens element $L_1$ and that of planoparallel glass plate P is not changed between the structures in FIGS. 1 and 2. There may be a case wherein the sum of the actual thickness of lens element $L_1$ and that of planoparallel glass plate P is slightly changed and the location of surface $r_1$ is also slightly changed when the thickness of planoparallel plate P is changed with the original optical performance maintained. This depends on the refractive index of planoparallel plate P and is true not only in the first embodiment, but also in the other embodiments to be described later. However, the original optical performance can be maintained by changing the optical thickness of lens element $L_1$ so as to compensate for any change in the optical thickness of planoparallel glass plate P.

Figure 3:
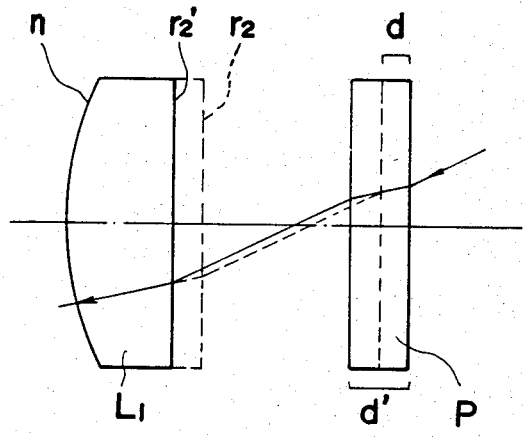

FIG. 3 discloses why the optical performance is maintained between the constructions in FIGS. 1 and 2. In FIG. 3, an identical light ray incident on planoparallel glass plate P emerges at the same point on surface $r_1$, with the same angle, regardless of its course which may differ depending on the thicknesses of $L_1$ and P. In the case of FIG. 1, a light ray transmitted through planoparallel glass plate P of thickness, d, enters into lens element $L_1$ at the location indicated with $r_2$, as is shown by broken line in FIG. 3. On the other hand, in the case of FIG. 2, the light ray is transmitted through a planoparallel glass plate P of a greater thickness, d', and then enters into lens element $L_1$ of a lesser thickness at the location indicated with $r'_2$, which is shown by solid line in FIG. 3. As is apparent from FIG. 3, the light ray is directed towards the screen side surface, $r_1$, of lens element $L_1$ with an identical angle and height from the optical axis in both cases. The above relation is true not only with the specific light ray actually shown in FIG. 3, but also with any other light rays passing through the planoparallel glass plate, P, at various angles and heights. Thus, the constructions in FIGS. 1 and 2 are optically equal to each other. This relation is possible only when a plastic lens element has a plane surface and the planoparallel glass plate faces the plane surface.

In FIG. 4, a ray, indicated by a broken line, passes through the planoparallel glass plate of thickness, d, and enters surface $r_2$, while the ray indicated by a solid line enters surface $r_2'$ by way of the transmission through the planoparallel glass plate of thickness d', to both reach surface $r_1$ with the same angle and same height, as is understood in a similar manner to that in FIG. 3. FIG. 4 shows that the optical equivalence holds true regardless of the location of the planoparallel glass plate along the optical axis as long as the planoparallel glass plate directly faces the plane surface of lens element $L_1$ which can be subjectively changed in its optical thickness to compensate for any necessary change in the optical thickness of the planoparallel glass plate.

In summary, any lens construction, such as in FIG. 1 or 2, is an optical equivalent of a basic lens construction shown in FIG. 5, which has a lens element, $L_1$, of an optical thickness equal to a sum of the optical thickness of the lens element, $L_1$, of FIG. 1 or 2 and that of the planoparallel glass plate, P, of FIG. 1 or 2. The tube side plane surface, $r_2''$, of the theoretical lens element $L_1$ in FIG. 5 is thus shifted towards the tube side, in comparison with a corresponding surface in FIG. 1 or 2, in order to compensate the optical thickness for inclusion of an expected planoparallel glass plate. In other words, the construction in FIG. 1 or 2 is formed by substituting a planoparallel glass plate for a part of a theoretical plastic lens element, $L_1$, of FIG. 5 with the resultant design optical thickness maintained.

Needless to say, any thickness of the planoparallel glass plate is theoretically possible in response to the required degree of X-ray shielding capacity. Therefore, once a lens system such as in FIG. 5 having three plastic lens elements, $L_1$, $L_2$ and $L_3$, has been designed from a purely optical point with the degree of X-ray shielding capacity left out of consideration (provided that element $L_1$ has a sufficient thickness, a considerable part of which is expected to be replaced by the planoparallel glass plate), an X-ray shielding capacity in various degrees can be easily and optionally added to the lens system with the designed optical performance perfectly maintained. Thus, the basic lens system parameters once designed have a "wide usability", i.e., an addition or change in the thickness of the planoparallel glass plate, P, for the required X-ray shielding ability means only a change in the thickness of the lens element, $L_1$, of the basically designed lens system of FIG. 5, and does not require any redesign of the other lens elements in the lens system or any fundamental change in manufacturing equipment.

As seen from FIG. 5, the first embodiment of the present invention has a lens element, $L_1$, of a relatively great thickness, and correspondingly thereto, a lens element, $L_3$, of a relatively small thickness for securing a relatively wide air space between lens element, $L_3$, and the face plate of the cathode ray tube.

FIG. 6 which also represents three plastic lens elements, $L_1$, $L_2$, and $L_3$, shows a second embodiment of the present invention, in which plastic lens $L_3$ has a plane surface on its tube side and the planoparallel glass plate, P, is located to face the plane surface of lens element $L_3$. In this embodiment, as well as in the first embodiment, the thickness of the planoparallel glass plate, P, can be freely changed with the thickness of lens element $L_3$ compensatorily changed so as to maintain the original optical performance.

Figure 7:
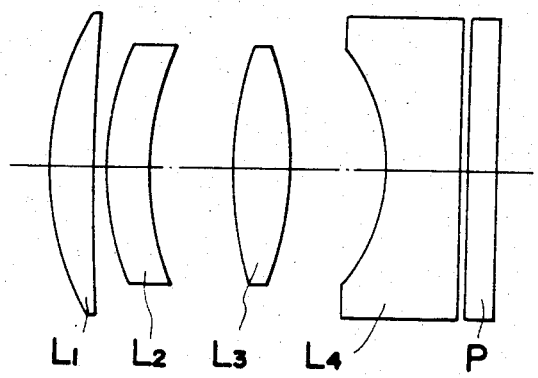
Figure 8:
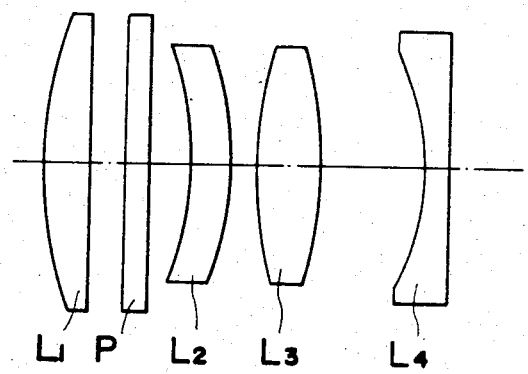

FIGS. 7 and 8 represent third and fourth embodiments of the present invention, respectively, both of which include four plastic lens elements, $L_1$, $L_2$, $L_3$, and $L_4$. In the third embodiment in FIG. 7, lens element $L_4$ has a plane surface on the tube side and the X-ray shielding planoparallel glass plate, P, is located to face the plane surface. In the fourth embodiment in FIG. 8, on the other hand, the plane surface is located at the tube side of lens element $L_1$ with the planoparallel glass plate, P, facing the lens element, $L_1$, at the tube side thereof.

Although all of the above four embodiments disclose a plane surface located on the tube side of a lens element, it is possible, according to the present invention, to provide a lens element with a plane surface on the screen side and to locate the planoparallel glass plate on the screen side of the lens element to face the plane surface thereof.

Figure 9:
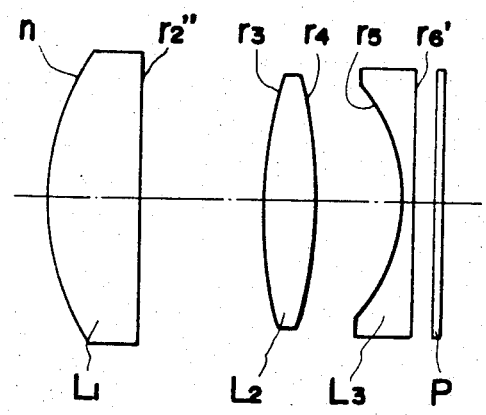
FIG. 9 represents a schematic cross sectional view of another optically equivalent modification of the first embodiment.

Further, if the number of the lens elements which have a plane surface is two or more in a lens system, it is possible, according to the present invention, to transfer the planoparallel glass plate to another place in the lens system without changing its optical performance. For instance, if the tube side surface, $r_6$, of lens element $L_3$, as well as surface $r_2$ of element $L_1$, is a plane surface in the first embodiment, the lens construction such as in FIG. 9, in which the planoparallel glass plate, P, faces plane surface $r_6'$ of element $L_3$, is an equivalent of that in FIG. 1. In other words, the sum of optical thicknesses of element $L_1$ and that of plate, P, in FIG. 1 is equal to the optical thickness of element $L_1$ in FIG. 9, while the optical thickness of element $L_3$ in FIG. 1 is equal to the sum of optical thicknesses of element $L_3$ and that of plate P in FIG. 9.

Figure 10:
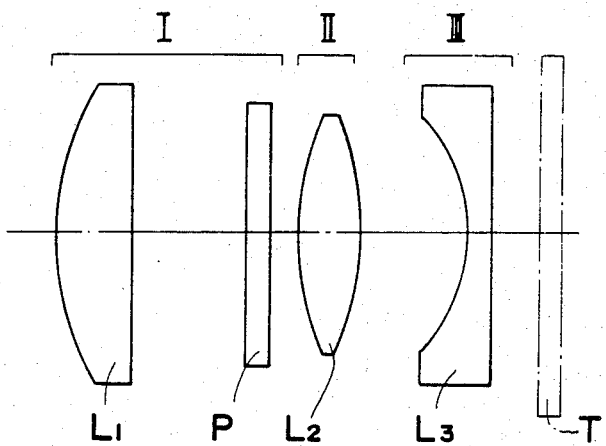
FIG. 10 represents a schematic cross sectional view of a first numerical example according to the first embodiment.
Figure 11A:
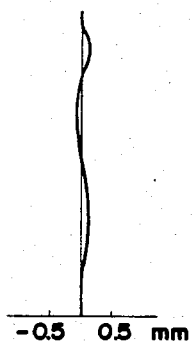
FIGS. 11a and 11b represent graphic plots of aberration curves of the first numerical example.
Figure 11B:
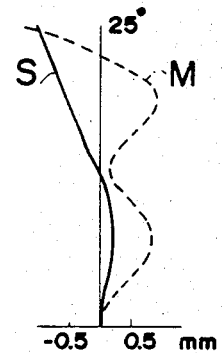
Figure 12:
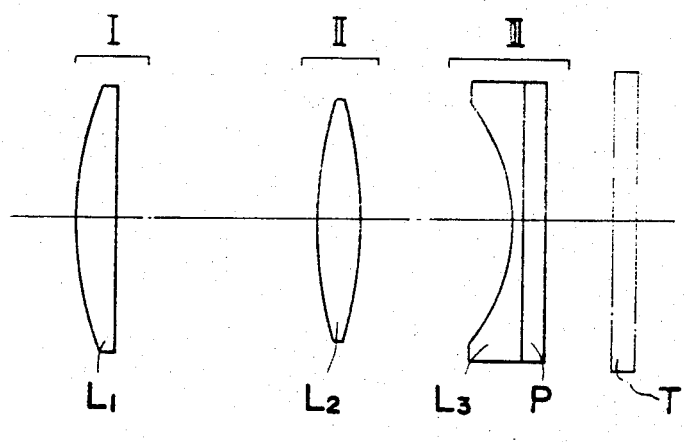
FIG. 12 represents a schematic cross sectional view of a second numerical example according to the second embodiment.
Figure 13A:
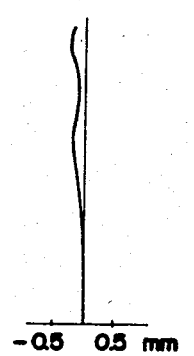
FIGS. 13a and 13b represent graphic plots of aberration curves of the second numerical example.
Figure 13B:
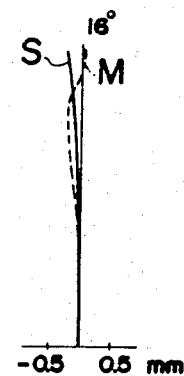

FIG. 10 shows Example 1 given in Table 1, which is a numerical example provided in accordance with the first embodiment shown in FIG. 1. FIGS. 11a and 11b are aberration curves of Example 1. FIG. 12 represents Example 2 given in Table 2, which is another numerical example corresponding to the second embodiment shown in FIG. 6, and the aberration curves are plotted in FIGS. 13a and 13a.

In Tables 1 and 2, radii of curvature, $r_1, r_2 ---$; axial distances, $d_1, d_2 ---$; refractive indices for light of d-line (with a wavelength, 587.6 nm), $n_1, n_2 ---$; and Abbe number for light of d-line, $\nu_1, \nu_2 ---$ are numbered from screen to tube side. Further, the radius of curvature with asterisk (*) means that that the corresponding surface is an aspheric surface defined by the following formula:

$$X = \frac{C_0 Y^2}{1 + (1 - C_0 Y^2)^{\frac{1}{2}}} + \sum_{i=1}^{8} C_i Y^{2i}$$

wherein: X represents the coordinate along the optical axis measured from the top of the basic spherical surface toward the tube side; Y represents the coordinate perpendicular to the optical axis measured from the optical axis (height from the optical axis); $C_0$ represents the curvature of the basic spherical surface of radius of curvature r ($C_0 = 1/r$); and Ci represents the aspheric surface coefficient. The lower part of Tables 1 and 2 summarizes the values for determining the aspheric surface with respect to each Example. (Curvature of the aspheric surface in the paraxial region is equal to $C_0 + 2C_1$.)

TABLE 1

[Example 1]

focal length f = 100, Magnification −0.125, $F_{No}$ 1.1

| | | Radius of Curvature | Axial Distance | Refractive Index (Nd) | Abbe Number ($\nu$d) |
|---|---|---|---|---|---|
| I | $L_1$ | $r_1^*$ 119.621 | | | |
| | | | $d_1$ 16.3 | $n_1$ 1.491 | $\nu_1$ 57.8 |
| | | $r_2$ ∞ | | | |
| | | | $d_2$ 53.7 | | |
| | P | $r_3$ ∞ | | | |
| | | | $d_3$ 5.0 | $n_2$ 1.538 | $\nu_2$ 57.5 |
| | | $r_4$ ∞ | | | |
| | | | $d_4$ 7.2 | | |
| II | $L_2$ | $r_5$ 96.436 | | | |
| | | | $d_5$ 16.9 | $n_3$ 1.491 | $\nu_3$ 57.8 |
| | | $r_6^*$ −80.701 | | | |
| | | | $d_6$ 39.6 | | |
| III | $L_3$ | $r_7^*$ ∞ | | | |
| | | | $d_7$ 5.0 | $n_4$ 1.491 | $\nu_4$ 57.8 |
| | | $r_8$ ∞ | | | |

| Aspheric Surface Coefficients | | |
|---|---|---|
| $r_1$ | $r_6$ | $r_7$ |
| $C_1$ 0.12926 × $10^{-2}$ | 0.12343 × $10^{-2}$ | −0.12265 × $10^{-1}$ |
| $C_2$ −0.25748 × $10^{-6}$ | 0.53314 × $10^{-6}$ | −0.54747 × $10^{-5}$ |
| $C_3$ 0.49598 × $10^{-10}$ | 0.38556 × $10^{-11}$ | 0.14821 × $10^{-7}$ |
| $C_4$ −0.43105 × $10^{-13}$ | −0.51567 × $10^{-13}$ | −0.16228 × $10^{-10}$ |
| $C_5$ −0.40561 × $10^{-18}$ | −0.22347 × $10^{-17}$ | 0.62424 × $10^{-14}$ |
| $C_6$ 0.31034 × $10^{-20}$ | 0.63548 × $10^{-20}$ | 0.12320 × $10^{-17}$ |
| $C_7$ −0.39840 × $10^{-24}$ | 0.22841 × $10^{-23}$ | −0.13634 × $10^{-20}$ |
| $C_8$ −0.37078 × $10^{-28}$ | 0.25831 × $10^{-27}$ | 0.21455 × $10^{-24}$ |

*represents an aspheric surface.

TABLE 2

[Example 2]

focal length f = 100, Magnification −0.15, $F_{NO}$ 1.6

| | | Radius of Curvature | Axial Distance | Refractive Index (Nd) | Abbe Number ($\nu$d) |
|---|---|---|---|---|---|
| I | $L_1$ | $r_1^*$ 136.279 | | | |
| | | | $d_1$ 7.0 | $n_1$ 1.491 | $\nu_1$ 57.8 |
| | | $r_2$ ∞ | | | |
| | | | $d_2$ 73.0 | | |
| II | $L_2$ | $r_3$ 85.212 | | | |
| | | | $d_3$ 11.5 | $n_2$ 1.491 | $\nu_2$ 57.8 |
| | | $r_4^*$ −81.147 | | | |
| | | | $d_4$ 39.6 | | |
| III | $L_3$ | $r_5^*$ ∞ | | | |
| | | | $d_5$ 2.0 | $n_3$ 1.491 | $\nu_3$ 57.8 |
| | | $r_6$ ∞ | | | |
| | | | $d_6$ 0.1 | | |
| | P | $r_7$ ∞ | | | |
| | | | $d_7$ 3.5 | $n_4$ 1.538 | $\nu_4$ 57.5 |
| | | $r_8$ ∞ | | | |

| Aspheric Surface Coefficients | | |
|---|---|---|
| $r_1$ | $r_4$ | $r_5$ |
| $C_1$ 0.17021 × $10^{-2}$ | 0.12588 × $10^{-2}$ | −0.15349 × $10^{-1}$ |
| $C_2$ −0.29009 × $10^{-6}$ | 0.39162 × $10^{-7}$ | −0.24396 × $10^{-5}$ |
| $C_3$ 0.18800 × $10^{-9}$ | 0.11306 × $10^{-8}$ | 0.95710 × $10^{-8}$ |
| $C_4$ −0.36794 × $10^{-12}$ | −0.16892 × $10^{-11}$ | −0.14829 × $10^{-10}$ |
| $C_5$ 0.38242 × $10^{-16}$ | 0.73467 × $10^{-16}$ | 0.64861 × $10^{-14}$ |
| $C_6$ 0.29165 × $10^{-18}$ | 0.16012 × $10^{-17}$ | 0.28294 × $10^{-17}$ |
| $C_7$ −0.10342 × $10^{-21}$ | −0.58335 × $10^{-21}$ | −0.14798 × $10^{-20}$ |
| $C_8$ −0.56336 × $10^{-25}$ | −0.30312 × $10^{-24}$ | 0.17282 × $10^{-24}$ |

*represents an aspheric surface.

As is clear from FIGS. 10 and 12, the numerical examples of the present invention each comprise, from the screen to tube side, a first positive lens unit (I), a second positive lens unit (II) defined between a pair of convex surfaces, and a third negative lens unit (III) having a screen side concave surface. In FIGS. 10 and 12, T represents the face plate of the cathode ray tube.

In the case of Example 1, shown in FIG. 10 and Table 1, the first positive lens unit (I) consists of a plano-convex single lens element, $L_1$, made of plastic, the tube side surface of which is plane, and an X-ray shielding planoparallel glass plate, P, facing the plane surface of element $L_1$; the second positive lens unit (II) consists of a biconvex plastic single lens element $L_2$; and the third negative lens unit (III) consists of a planoconcave single lens element, $L_3$, made of plastic, the concave surface being on the screen side. Face plate T is of refractive index, n-1.538, and Abbe number v-57.5, and has a thickness of 7.2, the righthand surface of which is the fluorescent surface. The air space from element $L_3$ to face plate T is 11.4. As is understood from Example 1, the first positive lens unit may comprise a plurality of lens elements. (Planoparallel glass plate is deemed as a lens element with non-power.) Further, the lens elements may be cemented to each other, if necessary.

In the case of Example 2 of Table 2 and FIG. 12, the first positive lens unit (I) consists of a plano-convex single lens element, $L_1$, made of plastic, the convex surface being on the screen side; the second positive lens units (II) consists of a biconvex plastic single lens element, $L_2$; and the third negative lens group (III) consists of a plano-concave single lens element, $L_3$, made of plastic, the tube side surface of which is plane, and an X-ray shielding planoparallel glass plate, P, facing the plane surface of element $L_3$. Face plate T comprises the same material as in Example 1 and has a thickness of 5.0 and is positioned from planoparallel glass plate P by 15.9. Example 2 corresponds to a case in which the third negative lens unit (III) comprises a plurality of lens elements.

Finally, the numerical examples of the present invention comprise the following features as understood from Tables 1 and 2. At least one surface of each of the lens units (I), (II), and (III) is an aspheric surface in the above embodiments.

Figure 14:
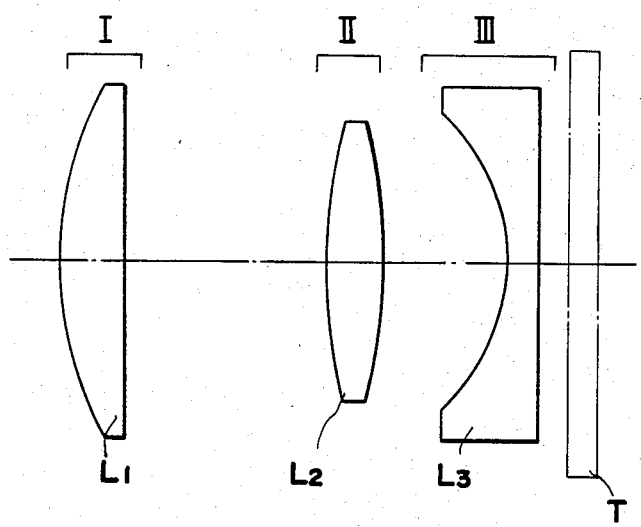
FIG. 14 represents a schematic cross sectional view of a fifth embodiment of the present invention.

A fifth and sixth embodiment of the present invention will now be described with reference to FIGS. 14 through 17. In these embodiments, each lens system will include a biconvex glass lens element having a specific capacity to control the level of emission of X-rays from a cathode ray tube. More specifically the glass lens element will be incorporated in the second positive lens unit, II, as can be seen in FIG. 14. Thus, lens element, $L_2$, is a biconvex glass lens element. The first positive lens unit, I, consists of a plano-convex simple lens element, $L_1$, formed of plastic with the side facing the cathode tube having a planar face surface. The third negative lens unit, III, consists of a plano-concave single lens element, $L_3$, also formed of plastic with the concave surface being on the screen side of the projection system.

The face plate, T, of the cathode ray tube has a refractive index, n, 1.536 and an Abbe number, ν, 50.7 with a thickness of 8.5 mm. The fluorescent surface is positioned on the right hand side of the plate T. Finally, the air space from lens element, $L_3$, to face plate, T, is 7.7 mm.

Figure 15A:
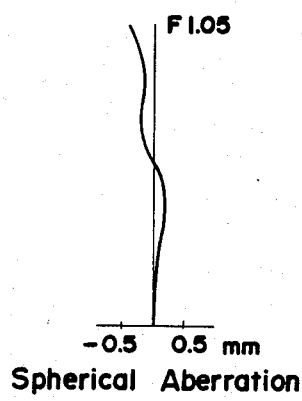
FIGS. 15a and 15b represent graphic plots of aberration curves of the fifth embodiment.
Figure 15B:
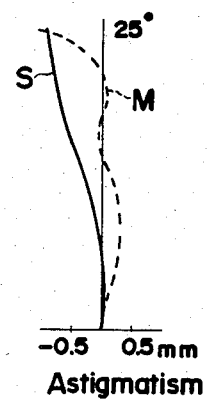

A graphic plot of spherical aberration and astigmatism is provided in FIGS. 15a and 15b.

Figure 16:
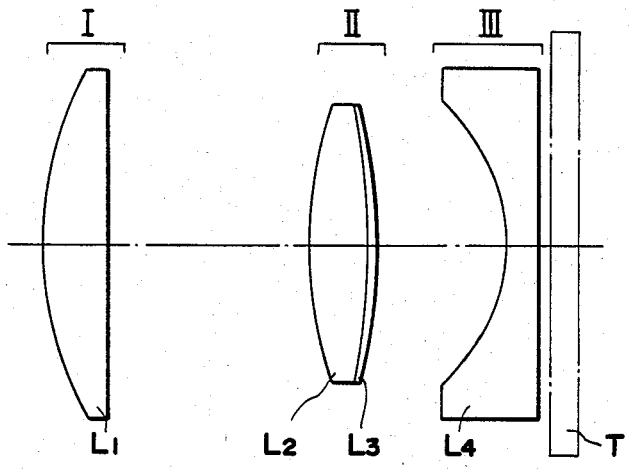
FIG. 16 represents a schematic cross sectional view of a sixth embodiment of the present invention.
Figure 17A:
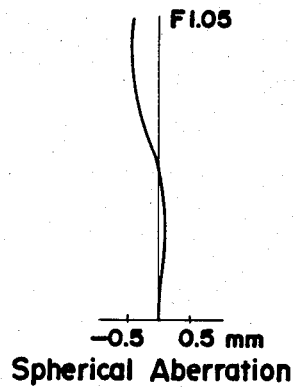
FIGS. 17a and 17b represent graphic plots of aberration curves of the sixth embodiment.
Figure 17B:
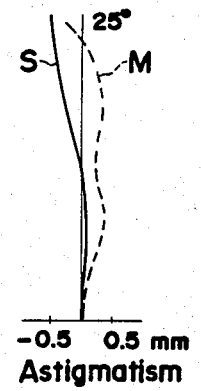

The final embodiment is disclosed in FIG. 16 wherein the first positive lens unit, I, consists of a plano-convex single lens element, L, made of plastic with the plano surface being on the cathode tube side. The second positive lens unit, II, consists of a biconvex glass lens element, $L_2$, for providing shielding of the X-rays attached to a thin plastic lens element, $L_3$, by cement. Thus, a cemented doublet of glass and plastic is provided having the manufacturing advantage of the plastic surface being aspheric.

The third negative lens group III, consists of a plano-concave single lens element, $L_4$, made of plastic and having a concave surface on the projection screen side. Face plate T has a refractive index, n, 1.536 and an Abbe number, ν, 50.7 with a thickness of 8.3 mm. The air space from element, $L_4$, to the face plate, T, is 3.9 mm.

The specific dimensions and aspheric surface coefficients are provided in the following Tables 3 and 4 for respectively examples 3 and 4.

TABLE 3

[Example 3]

focal length f = 100, Magnification −0.122, $F_{No}$ 1.05

|   |   |   | Radius of Curvature | Axial Distance | Refractive Index | Abbe Number (νd) |
|---|---|---|---|---|---|---|
| I | [ | $L_1$ ( $r_1$* | 144.076 | | | |
| | | $r_2$ | ∞ | $d_1$ 18.1 | $n_1$ 1.491 | $\nu_1$ 57.8 |
| | | | | $d_2$ 61.8 | | |
| II | [ | $L_2$ ( $r_3$ | 119.539 | | | |
| | | | | $d_3$ 15.8 | $n_2$ 1.620 | $\nu_2$ 60.3 |
| | | $r_4$ | −150.091 | | | |
| | | | | $d_4$ 36.8 | | |
| III | [ | $L_3$ ( $r_5$* | ∞ | | | |
| | | | | $d_5$ 9.1 | $n_3$ 1.491 | $\nu_3$ 57.8 |
| | | $r_6$ | ∞ | | | |

TABLE 3-continued

[Example 3]

Aspheric Surface Coefficient

| | $r_1$ | $r_5$ |
|---|---|---|
| $C_1$ | $0.26208 \times 10^{-2}$ | $-0.11508 \times 10^{-1}$ |
| $C_2$ | $-0.22078 \times 10^{-6}$ | $-0.38763 \times 10^{-5}$ |
| $C_3$ | $0.11738 \times 10^{-9}$ | $0.93770 \times 10^{-8}$ |
| $C_4$ | $-0.70595 \times 10^{-13}$ | $-0.11151 \times 10^{-10}$ |
| $C_5$ | $-0.52317 \times 10^{-19}$ | $0.45873 \times 10^{-14}$ |
| $C_6$ | $0.57586 \times 10^{-20}$ | $0.78070 \times 10^{-18}$ |
| $C_7$ | $-0.60807 \times 10^{-24}$ | $-0.82634 \times 10^{-21}$ |
| $C_8$ | $-0.98529 \times 10^{-28}$ | $0.76309 \times 10^{-25}$ |

*represents an aspheric surface.

TABLE 4

[Example 4]

focal length f = 100, Magnification −0.122, $F_{No}$ 1.05

|   |   |   | Radius of Curvature | Axial Distance | Refractive Index | Abbe Number (νd) |
|---|---|---|---|---|---|---|
| I | [ | $L_1$ ( $r_1$* | 168.929 | | | |
| | | | | $d_1$ 17.6 | $n_1$ 1.491 | ν 57.8 |
| | | $r_2$ | ∞ | | | |
| | | | | $d_2$ 59.2 | | |
| II | [ | $L_2$ ( $r_3$ | 138.735 | | | |
| | | | | $d_3$ 17.9 | $n_2$ 1.620 | $\nu_2$ 60.3 |
| | | $r_4$ | −214.948 | | | |
| | | | | $d_4$ 2.0 | $n_3$ 1.491 | $\nu_3$ 57.8 |
| | [ | $L_3$ ( $r_5$* | −132.472 | | | |
| | | | | $d_5$ 38.7 | | |
| III | [ | $L_4$ ( $r_6$* | ∞ | | | |
| | | | | $d_6$ 10.8 | $n_4$ 1.491 | $\nu_4$ 57.8 |
| | | $r_7$ | ∞ | | | |

Aspheric Surface Coefficient

| | $r_1$ | $r_5$ | $r_6$ |
|---|---|---|---|
| $C_1$ | $0.33122 \times 10^{-2}$ | $0.17879 \times 10^{-3}$ | $-0.12599 \times 10^{-1}$ |
| $C_2$ | $-0.14480 \times 10^{-6}$ | $0.39716 \times 10^{-7}$ | $-0.35625 \times 10^{-5}$ |
| $C_3$ | $0.76214 \times 10^{-10}$ | $0.46853 \times 10^{-10}$ | $0.10372 \times 10^{-7}$ |
| $C_4$ | $-0.57497 \times 10^{-13}$ | $-0.19400 \times 10^{-13}$ | $-0.13023 \times 10^{-10}$ |
| $C_5$ | $0.46838 \times 10^{-17}$ | $0.98969 \times 10^{-18}$ | $0.64752 \times 10^{-14}$ |
| $C_6$ | $0.48343 \times 10^{-20}$ | $0.90460 \times 10^{-20}$ | $0.24089 \times 10^{-18}$ |
| $C_7$ | $-0.80975 \times 10^{-24}$ | $0.50557 \times 10^{-24}$ | $-0.11402 \times 10^{-20}$ |
| $C_8$ | $-0.13712 \times 10^{-27}$ | $0.26655 \times 10^{-28}$ | $0.22772 \times 10^{-24}$ |

*represents an aspheric surface.

Each of the above lens system of the present invention fulfills the following conditions, for achieving a large aperture ratio, greater than F/2.0.

$$1.5f < f_1 < 2.0f \quad (1)$$

$$1.2 < f_1/f_2 < 2.5; \text{ and} \quad (2)$$

$$0.3f < D < 0.5f, \quad (3)$$

wherein: f represents the focal length of the entire lens system; $f_1$ represents the focal length of the first positive lens unit (I); $f_2$ represents the focal length of the second positive lens unit (II); and D represents the air space between the second positive lens unit (II) and the third negative lens unit (III).

Condition (1) defines the power distribution to the first positive lens unit (I), and condition (2) defines the relative power balance between the first and second positive lens units, (I) and (II), which bears the positive refractive power of the whole lens system. In other words, compliance with conditions (1) and (2) means that a consideralby great positive refractive power is distributed to the first positive lens unit (I) and the positive refractive power of the whole lens system is suitably shared between the first and second positive lens units (I) and (II) for balancing between the corrections for paraxial and off-axial aberrations as well as reducing the axial length of the lens system into a compact size. If one of the lower limits of conditions (1) and (2) are violated, the refractive power of the first positive lens unit (I) is excessively great resulting in a generation of spherical aberration of a higher degree and a negative deviation of the field curvature. On the other hand, the correction for field curvature is excessive and saggital flare occurs if either one of the upper limits of conditions (1) and (2) are violated. In any case of a violation of the above conditions, the corrections for paraxial and off-axial aberrations would not be sufficiently balanced, which is unfavorable to a desirable large aperture ratio.

Condition (3) defines the air space between the lens units (II) and (III) suitable for the power distribution defined by conditions (1) and (2). If the lower of condition (3) is violated, the field curvature will be negatively deviated and the astigmatic difference will be increased. On the other hand, with a violation of the upper limit of condition (3), the saggital flare will be under corrected and the air space between the third negative lens unit (III) and face plate T will be reduced to a practically impossible degree.

By adhering to the parameters and design considerations set forth in the above specification, a lens designer in the optical video field is capable of providing a projector lens system that can further control the level of emission of X-rays from a cathode ray tube. While the parameters of the present invention can be found in the above examples, the examples should not be considered limiting but rather illustrative of the advantages of the present invention.

Accordingly, the parameters of the present invention should be measured solely from the following claims, in which we claim:

1. A lens system for projecting onto a screen a video image formed on a face plate of a cathode ray tube comprising, from the screen to the tube side:
   a first positive lens unit;
   a second positive lens unit defined between a pair of convex surfaces, and
   a third negative lens unit having a screen side concave surface, wherein the lens system includes at least one aspheric surface and fulfills the following condition:

$1.5f < f_1 < 2.0f$, wherein f represents the focal length of the whole lens system; and $f_1$ represents the focal length of the first positive lens unit.

2. The invention of claim 1, wherein the lens system further fulfills the following condition:

$1.2 < f_1/f_2 < 2.5$, wherein $f_2$ represents the focal length of the second positive lens unit.

3. The invention of claim 1, wherein the lens system further fulfills the following conditions:

$0.3f < D < 0.5f$ wherein D represents the air space formed between the second positive lens unit and the third negative lens unit.

4. The invention of claim 1, wherein the first and third lens units each include an aspheric surface.

5. The invention of claim 1, wherein one of the first to third lens units includes a plastic lens element having a plane surface and an X-ray shielding planoparallel glass plate located so as to directly face the plane surface.

6. An improved video projector lens system according to the following design parameter:

| | | Raduis of Curvature | Axial Distance | Refractive Index | Abbe Number (νd) |
|---|---|---|---|---|---|
| I | $L_1$ | $r_1^*$ −144.076 | $d_1$ 18.1 | $n_1$ 1.491 | $\nu_1$ 57.8 |
| | | $r_2$ ∞ | | | |
| | | | $d_2$ 61.8 | | |
| II | $L_2$ | $r_3$ 119.539 | $d_3$ 15.8 | $n_2$ 1.620 | $\nu_2$ 60.3 |
| | | $r_4$ −150.091 | | | |
| | | | $d_4$ 36.8 | | |
| III | $L_3$ | $r_5^*$ ∞ | $d_5$ 9.1 | $n_3$ 1.491 | $\nu_3$ 57.8 |
| | | $r_6$ ∞ | | | |

| | Aspheric Surface Coefficient | |
|---|---|---|
| | $r_1$ | $r_5$ |
| $C_1$ | $0.26208 \times 10^{-2}$ | $-0.11508 \times 10^{-1}$ |
| $C_2$ | $-0.22078 \times 10^{-6}$ | $-0.38763 \times 10^{-5}$ |
| $C_3$ | $0.11738 \times 10^{-9}$ | $0.93770 \times 10^{-8}$ |
| $C_4$ | $-0.70595 \times 10^{-13}$ | $-0.11151 \times 10^{-10}$ |
| $C_5$ | $-0.52317 \times 10^{-19}$ | $0.45873 \times 10^{-14}$ |
| $C_6$ | $0.57586 \times 10^{-20}$ | $0.78070 \times 10^{-18}$ |
| $C_7$ | $-0.60807 \times 10^{-24}$ | $-0.82634 \times 10^{-21}$ |
| $C_8$ | $-0.98529 \times 10^{-28}$ | $0.76309 \times 10^{-25}$ |

*represents an aspheric surface.

7. The invention of claim 3, wherein the condition for D is as follows:

$0.3f < D < 0.45f$.

8. A lens system for projecting onto a screen a video image formed on a face place of a cathode ray tube comprising, from the screen to the tube side:
   a first positive plastic lens unit;
   a second positive plastic lens unit defined between a pair of convex surfaces, and
   a third negative plastic lens unit having a screen side concave surface directly facing the tube side convex surface of the second positive plastic lens unit, wherein the lens system includes at least one aspheric surface and fulfills the following condition:

$1.2f < f_1 < 2.5f$, wherein f represents the focal length of the whole lens system; and $f_1$ represents the focal length of the first positive plastic lens unit.

9. The invention of claim 8, wherein the lens system further fulfills the following condition:

$1.2 < f_1/f_1 < 2.5$, wherein $f_2$ represents the focal length of the second positive plastic lens unit.

10. The invention of claim 8, wherein the lens system further fulfills the following condition:

$0.3f < D < 0.5f$ wherein D represents the air space formed between the second positive plastic lens unit and the third negative plastic lens unit.

11. A lens system for projecting onto a screen a video image formed on a face plate of a cathode ray tube comprising, from the screen to the tube side:
   a first positive lens units;
   a second positive lens unit defined between a pair of convex surfaces; and
   a third negative lens unit having a screen side concave surface, wherein the lens system includes at least one aspheric surface and fulfills the following condition:

$0.3f < D < 0.45f$ $1.2f < f_1 < 2.5f$ wherein $f_1$ represents the focal length of the first positive lens unit, D represents the air space formed between the second positive lens unit and the third negative lens units, and f represents the focal length of the whole lens system.

UNITED STATES PATENT OFFICE
CERTIFICATE OF CORRECTION

Patent No. 4,577,935             Dated  March 25, 1986

Inventor(s) Kazuo Yamakawa & Toshihide Dohi

It is certified that error appears in the above-identified patent and that said Letters Patent are hereby corrected as shown below:

Column 7, line 11, after "and" delete "13a" and insert --13b--.

Column 12, line 60, after "f1/" delete "f1" and insert --f2--.

Signed and Sealed this

Twenty-ninth Day of July 1986

[SEAL]

Attest:

Attesting Officer

DONALD J. QUIGG

Commissioner of Patents and Trademarks